United States Patent
Ito et al.

(10) Patent No.: US 8,725,074 B2
(45) Date of Patent: May 13, 2014

(54) COMMUNICATION DEVICE, COMMUNICATION SYSTEM, COMMUNICATION METHOD AND PROGRAM

(75) Inventors: Tsutomu Ito, Tokyo (JP); Itaru Maekawa, Nagano (JP); Hidemasa Yoshida, Tokyo (JP); Akihiro Ihori, Kanagawa (JP); Shinsuke Tashiro, Kanagawa (JP)

(73) Assignee: Sony Corporation, Tokyo (JP)

( * ) Notice: Subject to any disclaimer, the term of this patent is extended or adjusted under 35 U.S.C. 154(b) by 445 days.

(21) Appl. No.: 12/543,851

(22) Filed: Aug. 19, 2009

(65) Prior Publication Data

US 2010/0048130 A1    Feb. 25, 2010

(30) Foreign Application Priority Data

Aug. 20, 2008  (JP) ................ 2008-212287

(51) Int. Cl.
*H04B 7/00*   (2006.01)
(52) U.S. Cl.
USPC ...................................... 455/41.2
(58) Field of Classification Search
USPC ...................................... 455/41.1
See application file for complete search history.

(56) References Cited

U.S. PATENT DOCUMENTS

| 2006/0159158 | A1 | 7/2006 | Moore et al. | |
| 2009/0193139 | A1* | 7/2009 | Sano et al. | 709/232 |
| 2009/0196309 | A1* | 8/2009 | Fujinaga et al. | 370/474 |
| 2010/0267334 | A1* | 10/2010 | Hashimoto et al. | 455/41.2 |

FOREIGN PATENT DOCUMENTS

| EP | 2 106 108 A1 | 9/2009 |
| JP | 2003-198568 | 7/2003 |
| JP | 2005-191819 | 7/2005 |
| JP | 2008-99236 | 4/2008 |
| JP | 2008-526066 | 7/2008 |
| WO | WO 2006/067528 A2 | 6/2006 |
| WO | WO 2006/111782 A1 | 10/2006 |
| WO | WO 2009/045085 A1 | 4/2009 |

OTHER PUBLICATIONS

Patrick Henzen, "Near Field Communication Technology and the Road Ahead", NFC Forum, URL: http://mobile.hkwdc.org/nfc2007/presentations/NFCForum.pfd>, XP002562636, Feb. 2007, pp. 1-35.
"Sony Announces TransferJet", Card Technology Today, vol. 20, No. 2, XP022496409, Feb. 1, 2008, pp. 6-7.
Marwan Jabri, "Fast Session Setup Extensions to H.324", Dilithium Networks, International Telecommunication Union, Telecommunication Sector, Vol . Study Group 16—Delayed Contribution 32, XP017407822, Nov. 16, 2004, pp. 1-18.

* cited by examiner

*Primary Examiner* — David Bilodeau
(74) *Attorney, Agent, or Firm* — Oblon, Spivak, McClelland, Maier & Neustadt, L.L.P.

(57) ABSTRACT

A communication device of the present invention includes a physical layer for performing close-range one-to-one communication with a device of a communication counterpart by electric field coupling or magnetic field coupling; one or a plurality of PCL Emulations for converting a protocol of a higher level application to a protocol for communicating at the physical layer; and a PCL common for performing negotiation with the device of the communication counterpart without the higher level application started after the connection with the communication counterpart is established or at the same time as the connection establishment to select one PCL Emulation.

9 Claims, 21 Drawing Sheets

COMMUNICATION DEVICE, COMMUNICATION SYSTEM, COMMUNICATION METHOD AND PROGRAM

BACKGROUND OF THE INVENTION

1. Field of the Invention

The present invention relates to a communication device, a communication system, a communication method, and a program.

2. Description of the Related Art

As described in Japanese Patent Application Laid-Open No. 2005-191819, a mobile communication system enabling a user of the mobile object to transmit information of the mobile object to a general-purpose portable terminal, which the user owns, is known in the related art.

SUMMARY OF THE INVENTION

Recently, a plurality of higher level applications is assumed to be loaded in the communication device. In such device, the protocol of the higher level application is assumed to be in plurals.

If the protocol of the higher level application is in plurals, however, which protocol to use for realizing communication become a problem and an event in which compatibility degrades when connecting with the communication counterpart can be assumed depending on the protocol to use. In this case, even if multi-function by a plurality of applications is realized on the communication device side, compatibility of the communication may not be achieved with another device, and as a result, restriction in system arises.

When attempting to obtain compatibility assuming the higher level application has started, a process for starting the higher level application is necessary in advance, and an optimum application responding to compatibility may not be selected.

The present invention addresses the above-identified, and other problems associated with conventional methods and apparatuses, and it is desirable to provide a new and improved communication device, a communication system, a communication method, and a program capable of reliably ensuring the compatibility of the communication regardless of whether or not the higher level application is started when the higher level application includes one or a plurality of protocols.

According to an embodiment of the present invention, there is provided a communication device including: a physical layer for performing close-range one-to-one communication with a device of a communication counterpart by electric field coupling or magnetic field coupling; one or a plurality of conversion processing units for converting a protocol of a higher level application to a protocol for communicating at the physical layer; and a selection processing unit for performing negotiation with the device of the communication counterpart without the higher level application started after the connection with the communication counterpart is established or at the same time as the connection establishment to select one conversion processing unit.

The selection processing unit may include a negotiation function portion for performing the negotiation without the higher level application started.

The selection processing unit may perform a process of transmitting information related to the one or plurality of conversion processing units to the device of the communication counterpart when negotiating with the device of the communication counterpart.

The selection processing unit may give priority to the one or plurality of conversion processing units and perform a process of transmitting to the device of the communication counterpart when negotiating with the device of the communication counterpart.

The communication device may further include a higher level application starting unit for starting the higher level application when one conversion processing unit is selected by the selection processing unit.

The selection processing unit may acquire identification information related to the device of the communication counterpart, and select one conversion processing unit based on the identification information.

According to another embodiment of the present invention, there is provided a communication system including: a first communication device for performing communication with a second communication device through a close-range one-to-one communication by electric field coupling or magnetic field coupling; and the second communication device including a physical layer for performing communication with the first communication device, one or a plurality of conversion processing units for converting a protocol of a higher level application to a protocol for communicating at the physical layer, and a selection processing unit for performing negotiation with the device of the communication counterpart without the higher level application started after the connection with the communication counterpart is established or at the same time as the connection establishment to select one conversion processing unit.

According to another embodiment of the present invention, there is provided a communication method including the steps of: establishing a connection of close-range one-to-one communication with a device of a communication counterpart by electric field coupling or magnetic field coupling; and performing negotiation with the device of the communication counterpart without the higher level application started after the connection with the communication counterpart is established or at the same time as the connection establishment to select one conversion processing unit for converting a protocol of the higher level application to a protocol for communicating at the physical layer.

According to another embodiment of the present invention, there is provided a program for causing a computer to function as: a means for performing close-range one-to-one communication with a device of a communication counterpart by electric field coupling or magnetic field coupling; one or a plurality of conversion means for converting a protocol of a higher level application to a protocol for communication; and a means for performing negotiation with the device of the communication counterpart without the higher level application started after the connection with the communication counterpart is established or at the same time as the connection establishment to select one conversion means.

According to the present invention, when the higher level application includes one or a plurality of protocols, the compatibility of communication can be reliably ensured regardless of whether or not the higher level application is started.

DETAILED DESCRIPTION OF THE PREFERRED EMBODIMENTS

Figure 1:
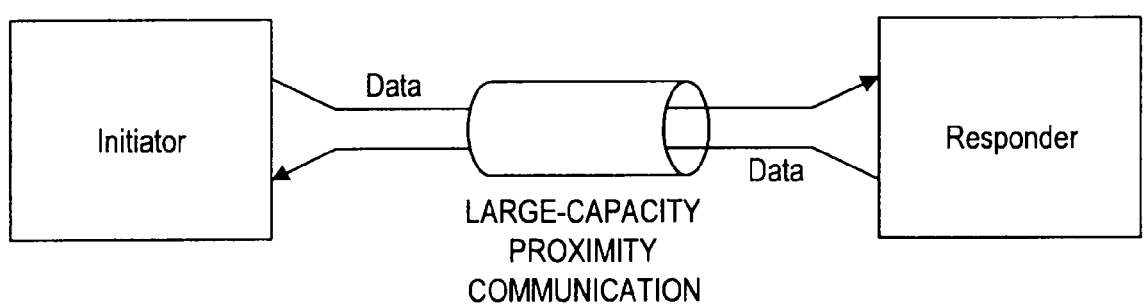
FIG. 1 is a schematic view showing two devices configuring a wireless communication system of the present embodiment.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted. The description will be made in the following order.

1. Regarding communication system according to one embodiment of the present invention
2. Configuration of communication device
3. Specific example of connection establishment process and negotiation process

[Outline of Communication System According to One Embodiment of the Present Invention]

A wireless communication system of the present embodiment is a communication method aimed to transmit and receive data between a pair of devices, where data is wirelessly transmitted and received between devices at close-range. FIG. 1 is a schematic view showing two devices (communication devices) configuring a wireless communication system of the present embodiment. The two devices respectively have a role of a responder and an initiator. The initiator is the "side making a connection request" and the responder is the "side receiving a connection request", where a one-to-one (P2P) communication is performed in the present embodiment. In connection, the initiator makes a connection request and the responder is in a standby state, but the configurations of the devices related to the connection are the same although the role of the devices is different in connection.

In FIG. 1, a state in which wireless communication is performed through a physical layer arranged in each device of the present embodiment is schematically shown. In the present embodiment, a so-called physical layer for large-capacity proximity communication is illustrated for the physical layer, but the physical layer is not limited thereto, and a general-purpose physical layer for communication can be applied. The physical layer for large-capacity proximity communication is particularly suited for communication of large-capacity data such as pictures, moving images, and the like by using profile ID, CSDU, and the like. In the specification, the devices of both the initiator and the responder are sometimes collectively referred to as large-capacity proximity communication device.

The initiator and the responder include an electrode plate called an electric field coupler capable of electric field coupling to each other. When the electric field couplers of both the initiator and the responder are brought close to within 3 cm, for example, the change in inductive electric field generated by one electric field coupler is sensed by the other electric field coupler, so that one-to-one electric field communication is realized between the initiator and the responder.

When the initiator and the responder are brought close, the responder receives a connection establishment request (connection request frame) transmitted from the initiator. When the responder receives the connection establishment request, the responder transmits a connection response permission (connection response frame) to the initiator. The communication connection of the initiator and the responder is established when the initiator receives the connection response permission. As hereinafter described in detail, after the connection is established, the initiator and the responder perform a negotiation, where the data communicable state is obtained between the initiator and the responder when the negotiation is normally completed. In data communication, the initiator and the responder transmit and receive data through the electric field coupler. The data transmitted and received in this case includes music data such as music, lecture and radio program, video data such as movie, television program, video program, picture, document, drawing, and figure, game, and software.

As opposed to the electric wave radiated from the antenna of electric wave communication method attenuating inversely proportional to the square of the distance, the intensity of the inductive electric field generated from such electric field coupler is inversely proportional to the fourth power of the distance, and thus an advantage in that the distance between the pair of devices that can perform electric field communication can be limited is achieved. In other words, according to the electric field communication, degradation of signal due to obstacles existing at the periphery is small, and a technique for ensuring hacking and confidentiality can be simplified.

The electric wave radiated from the antenna contains horizontal wave component that vibrates in a direction orthogonal to the advancing direction of the electric wave, and includes a polarized wave. The electric field coupler contains vertical wave component that vibrates in the advancing direction, does not include a polarized wave and generates the inductive electric field, and thus convenience is high in that the signal can be received on the reception side as long as the surfaces of the pair of electric field couplers are facing each other.

In the specification, description will be made focusing on an example in which a pair of communication devices performs close-range wireless communication (non-contact communication, large-capacity proximity communication) using the electric field couplers, but the present invention is not limited to such example. For instance, the pair of communication devices can perform close-range wireless communication through a communication unit capable of communicating through magnetic field coupling. According to the communication method using electric field coupling or magnetic field coupling, the signal is not transmitted if the communication counterpart is not close, and thus such communication method is advantageous than the electric wave communication method in that the problem of interference is less likely to occur.

The initiator and the responder shown in FIG. 1 are respectively an information processing device such as PC (Personal Computer), and household video processing device (DVD recorder, video cassette recorder etc.). The initiator and the responder are also an information processing device such as portable telephone, PHS (Personal Handyphone System), portable music reproduction device, portable video processing device, and PDA (Personal Digital Assistants). The initiator and the responder may also be an information processing device such as home video game, portable game, and home electronics.

Figure 2:
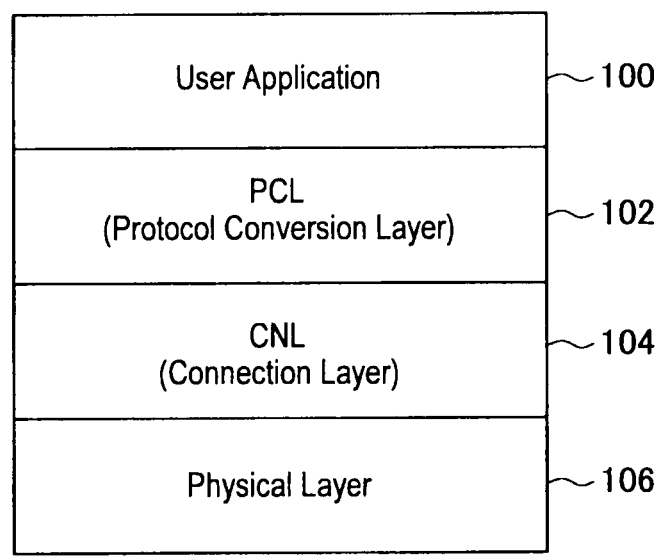
FIG. 2 is a schematic view showing a configuration of each device of an initiator and a responder as a hierarchical structure.

FIG. 2 is a schematic view showing a configuration of each device of the initiator and the responder as a hierarchical structure in the wireless communication system according to the present embodiment. As shown in FIG. 2, in the present embodiment, a user application 100, a PCL (Protocol Conversion Layer) 102, a CNL (Connection Layer) 104, and a physical layer 106 are configured in order from the upper layer.

The user application 100 is the higher level protocol (e.g., USB, TCP/IP, OBEX, etc.) for performing data communication using the service provided by the software of upper layer of the physical layer 106 in the device mounted with the physical layer 106 capable of performing close-range wireless communication. The user application 100 is the application (e.g., OS such as Windows (registered trademark)), and Linux) for performing the device operation including the large-capacity proximity communication device such as UI (User Interface). In the large-capacity proximity communication device, the higher level protocol or the user application is not particularly limited, and can be freely set by the user (manufacturing company) forming the device. Therefore, each device may have a plurality of higher level protocols or user applications 100.

The PCL 102 (protocol conversion unit) supports the protocol conversion function for mutually converting an arbitrary protocol (USB, OBEX, etc.) used by the user forming the device to a protocol unique to the large-capacity proximity communication. Various protocols then can be supported by providing a plurality of types of protocols to the physical layer (PHY Layer) 106 for large-capacity proximity communication. The protocol conversion sometimes differs even if the protocol is the same depending on the difference in OS such as Windows and Linux. The PCL 102 performs a process of converting the content data such as audio and video generated by the user application 100 of higher level, data of other protocols, command and the like to a data format that can be handled by the CNL 104 of lower level. The PCL 102 performs processes necessary for the large-capacity proximity communication such as connection, disconnection, device authentication, operation mode setting, and initialization.

Figure 3:
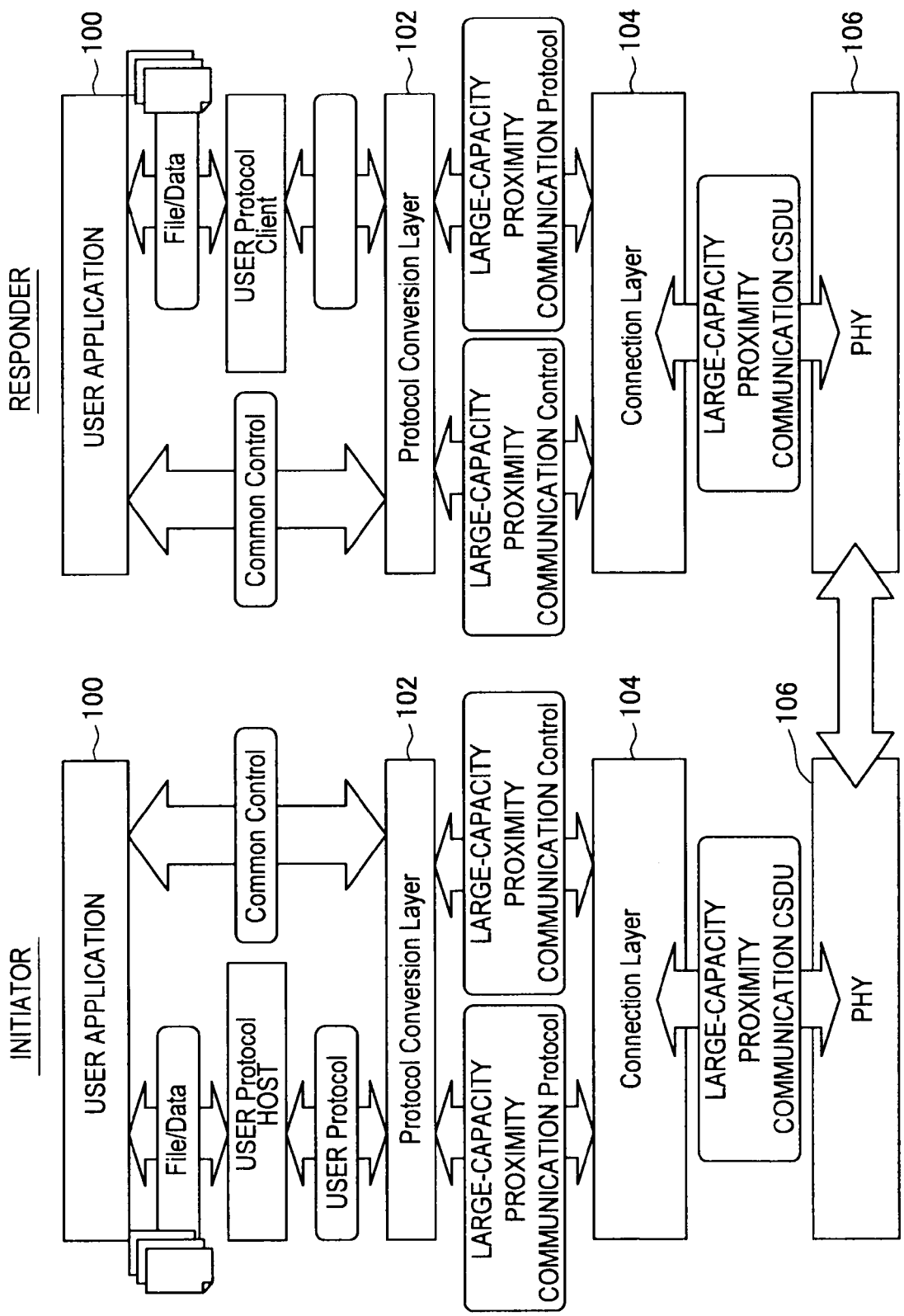
FIG. 3 is a schematic view showing the data flow in the initiator and the responder.

FIG. 3 is a schematic view showing the data flow in the initiator and the responder. As shown in FIG. 3, the user application 100 performs two types of control, the connection by the large-capacity proximity communication and the data transfer. In the large-capacity proximity communication device, the highest level PCL 102 provides services necessary to realize such functions and performs the conversion to the protocol unique to the large-capacity proximity communication and the connection management. The PCL 102 also performs handover to the CNL 104 that generates the CSDU (CNL service data unit) complying with the standard for large-capacity proximity communication.

The CNL 104 shapes the data received from the PCL 102 of higher level to a predetermined packet structure (CSDU packet), and performs transmission between the initiator and the responder. In the CNL 104, the parameter for understanding the type of CSDU packet is added to the CSDU packet header. In reception, the CNL 104 analyzes the data received from the physical layer 106, extracts the CSDU packet, and provides the payload thereof to the PCL 102 of higher level. The CSDU contains status information usable in the user application 100 other than the communication by the physical layer (PHY Layer) 106, and the CNL 104 also performs generation process thereof, error notification, and the like.

The CNL 104 itself can receive data transmitted from different protocols from the PCL 102. However, since transmission and reception of data of different protocols desirably require once disconnecting the session in the large-capacity proximity communication device, the CNL service is not used in a plurality of protocols.

Due to such limitation, even if input of data is made from a plurality of PCL Emulations to the CNL 104, the CNL 104 does not multiplex such data. Furthermore, processes such as analysis of the protocol, distribution to the PCL 102 according to the respective protocol content, or disconnection of session by error detection are not performed even if the reception data contains a plurality of protocols.

Thus, on the PCL 102 side using the service by the CNL 104, the service by the CNL 104 is used with the protocol to use decided on one type. Judgment on confirming the protocol method and performing the necessary transmission and reception are roles of the PCL Common, to be hereinafter described, and generation of the protocol data and parse are performed by the PCL Emulation. Exclusion process is also performed by the PCL Common so that the CNL service is not simultaneously used from a plurality of protocols.

The CNL 104 provides the service necessary for the PCL Common to establish the connection, and the service necessary for the PCL Emulation to transmit and receive data after the connection is established.

The CNL 104 receives profile ID indicating whether the currently executed service is the intermediate data of the entire transfer size, the last data, or is a parameter and not data, data size, and the like from the PCL 102 as parameters. Such parameters are inserted to the CSDU packet header. The CNL 104 embeds the transmission parameter to one part of the CSDU packet generated when the large-capacity proximity communication device transmits the data to realize a plurality of logic channels (Channel) on one physical layer (PHY Layer) 106.

The CNL 104 performs data transfer in units of CSDU. The CNL 104 gives the following three types of profile IDs (T_DATA, LT_DATA, CNL_DATA) to the CSDU in time of CSDU transmission. In CSDU reception, the CNL 104 performs a process corresponding to the type of profile ID.

T_DATA, LT_DATA

The CNL 104 gives T_DATA to the CSDU transferring the user data. However, if it is the last CSDU in the division to the CSDU payload, the CNL 104 gives LT_DATA. Only the user data is stored in the payload of the CSDU, and the CNL 104 may not embed the header information and the like.

CNL_DATA

The CNL 104 gives CNL_DATA to the CSDU for transferring the control data unique to the large-capacity proximity communication system. Examples of the control data are parameter information and the like. The header information is embedded in the CSDU payload. The CNL 104 analyzes such head information, and performs an appropriate process.

The CNL 104 performs the communication using the service of the physical layer 106 in response to the request of the higher level layer, and in addition, performs establishment of the connection of the physical layer 106, disconnection, guarantee of continuity of data, and the like.

The physical layer 106 is a physical layer of wireless communication system capable of carrying out the large-capacity proximity communication according to the present embodiment, and includes an error correcting function and a preamble sense function.

Figure 4:
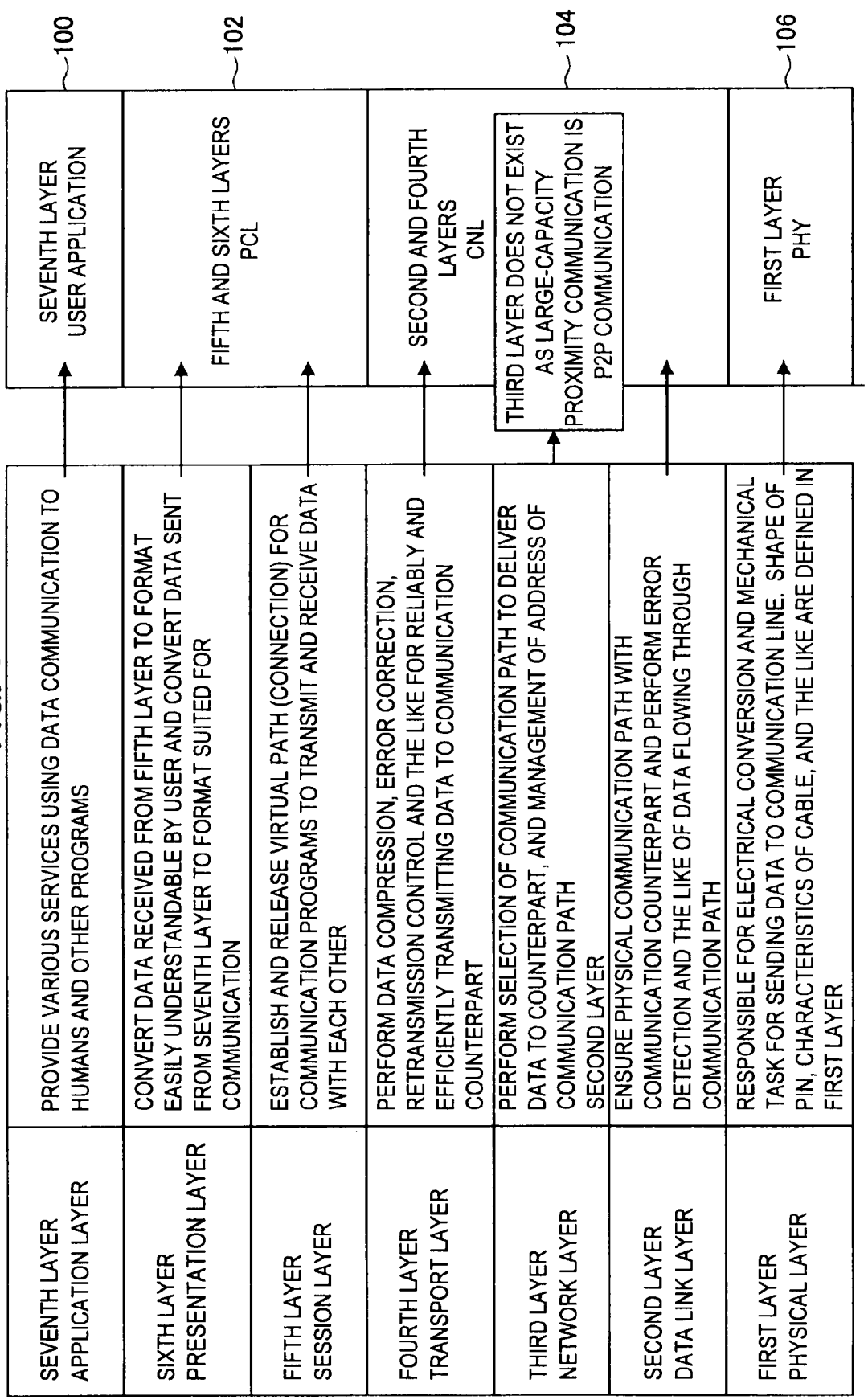
FIG. 4 is a schematic view showing the configuration of FIG. 2 in OSI reference model.

FIG. 4 shows the configuration of FIG. 2 in OSI reference model based on the role of the software of the device mounted with the large-capacity proximity communication device. As shown in FIG. 4, the physical layer (first layer) 106 is responsible for electrical conversion and mechanical task for sending data to the communication line. The shape of the pin, characteristics of the cable, and the like are also defined in the first layer.

The CNL 104 corresponds to the data link layer (second layer) and the transport layer (fourth layer). The data link layer ensures a physical communication path with the communication counterpart, and performs error detection and the like of the data flowing through the communication path. The transport layer performs data compression, error correction, retransmission control and the like for reliably and efficiently transmitting the data to the communication counterpart. Since the system of the present embodiment is a P2P communication, the network layer (third layer) in the OSI reference model is not arranged, and the system can be simplified.

The PCL 102 corresponds to the session layer (fifth layer) and the presentation layer (sixth layer). The session layer performs establishment and release of a virtual path (connection) for the communication programs to transmit and receive data with each other. The presentation layer performs processes such as converting the data received from the session layer to a format easily understandable by the user, and converting the data sent from the application layer to a format suited for communication.

The user application 100 corresponds to the application layer (seventh layer). The application layer provides various services using data communication to humans and other programs.

Figure 5:
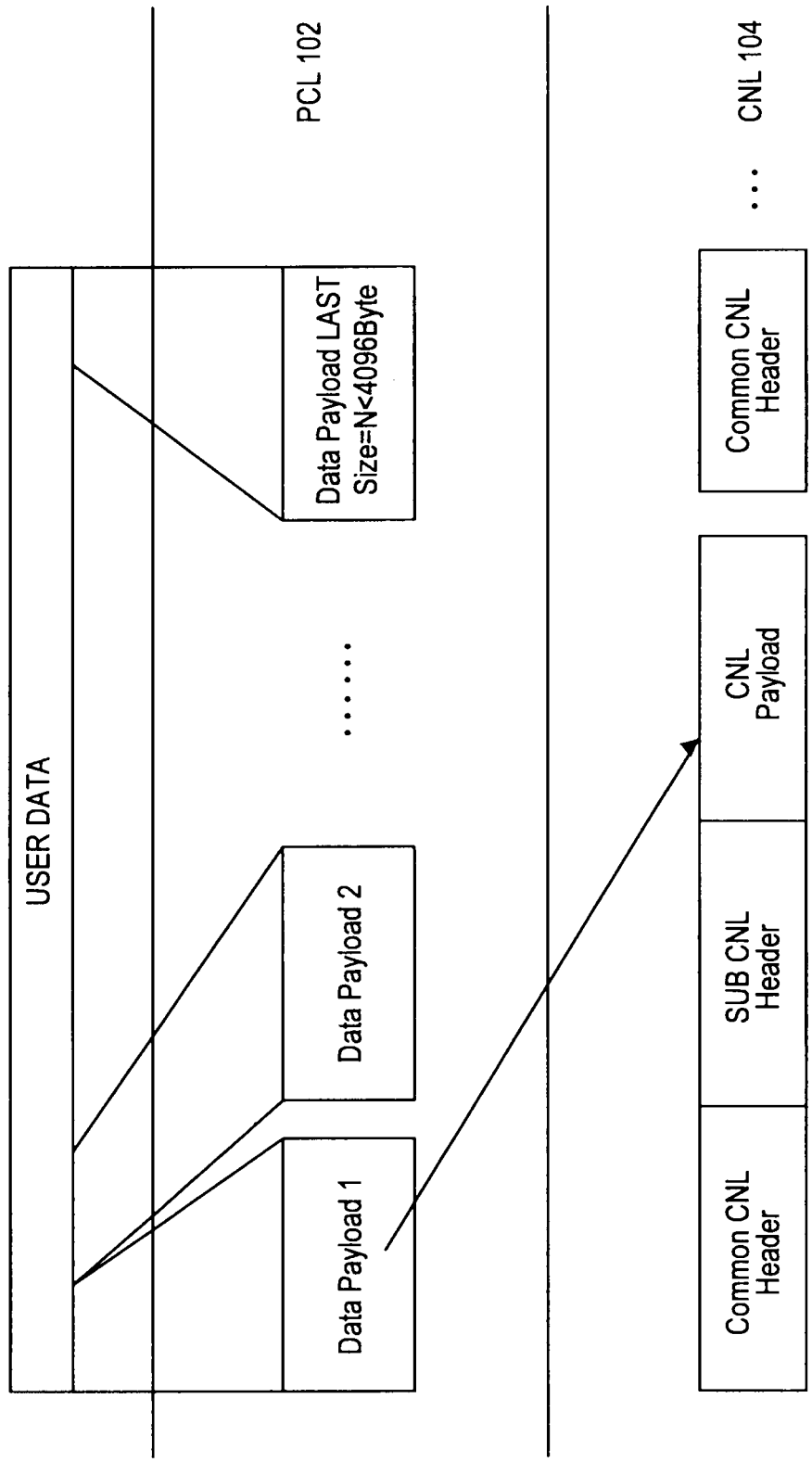
FIG. 5 is a schematic view showing a data flow of the transmission and reception of file and data in each layer of the device.

The data flow in the communication device of the present embodiment will now be described. FIG. 5 is a schematic view showing a data flow, and shows the data flow of the transmission and reception of file and data in each layer of the large-capacity proximity communication device. The functions of the PCL 102 are divided to the PCL Common and the PCL Emulation. The PCL Emulation is used in data transfer, and thus the process by the PCL 102 shown in FIG. 5 is a function realized by the PCL Emulation. The CSDU input to the physical layer 106 is defined as the data format.

As hereinafter described, the PCL Common for providing a common function is defined, but the PCL Emulation depends on the system specification corresponding to the respective protocols as it performs the data conversion process complying with the user protocol.

In the large-capacity proximity communication, transmission and reception of not only data such as files but of management parameters in the PCL 102 and data between the same layers of the communicating destination exist. Such files and parameter types are ultimately transmitted by the CNL 104 in a form complying with the CSDU format. The Profile ID is used to specify the type of data. A plurality of transmission channels then can be logically used at the physical layer 106 level. Therefore, the communication rate can be greatly enhanced, and in particular, it is suitable for communicating data of large-capacity such as moving image.

Figure 6:
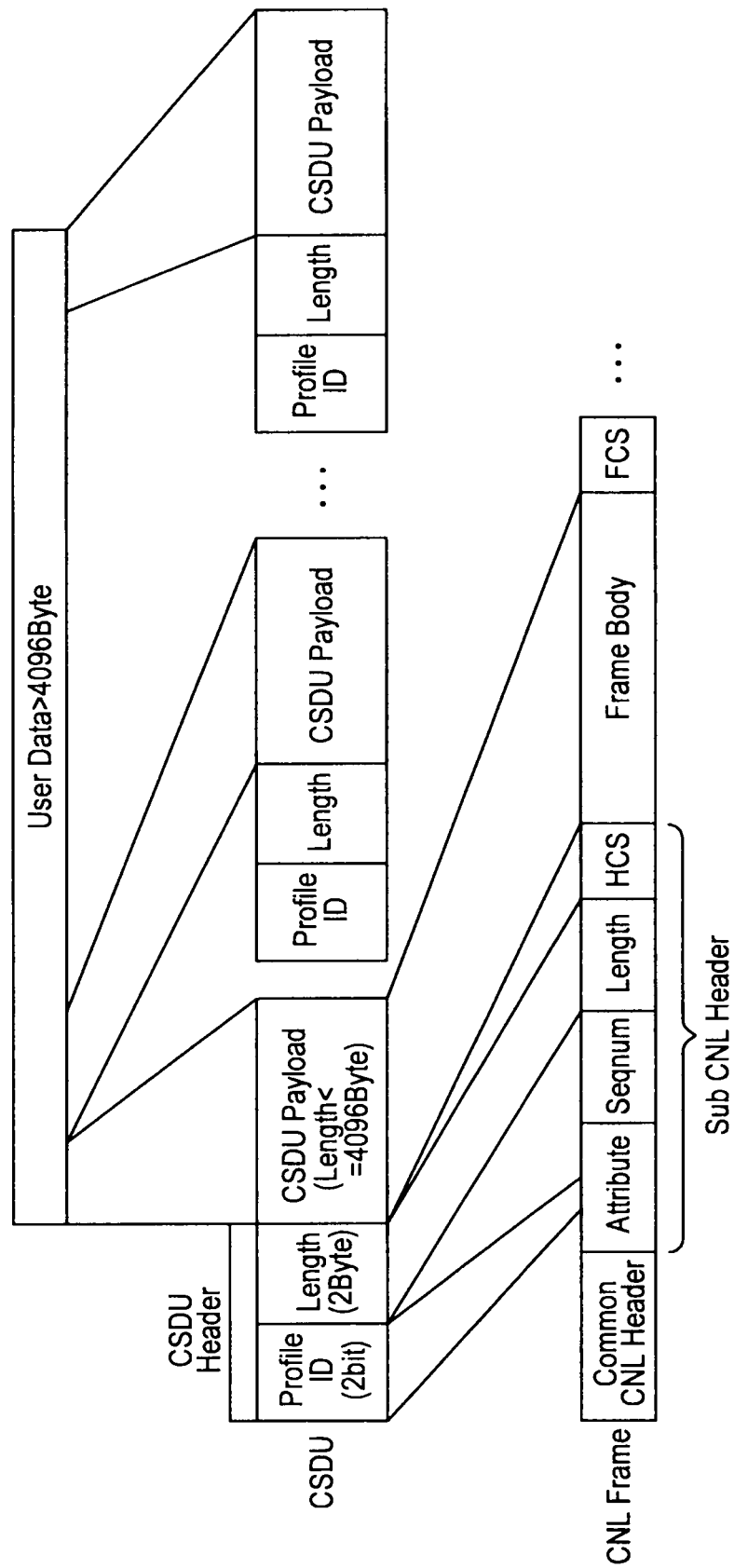
FIG. 6 is a schematic view showing a state in which the CSDU is mapped.

FIG. 6 is a schematic view showing a state in which the CSDU is mapped. As shown in FIG. 6, the CSDU is mapped on a CNL frame. The user data size transmitted and received by the user application 100 is not particularly defined. If the length of the data exceeds the data divided length (maximum of 4096 bytes), the PCL 102 divides the data to a plurality of CSDU payloads. The PCL 102 calls out the CNL service and performs transmission and reception of the user data in units of CSDU payloads. The CNL adds the header to the CSDU payload and provides the same to the lower level layer. The CSDU header is configured by the Profile ID and the Length indicating the length of the CSDU payload.

[Configuration of Communication Device]

Figure 7:
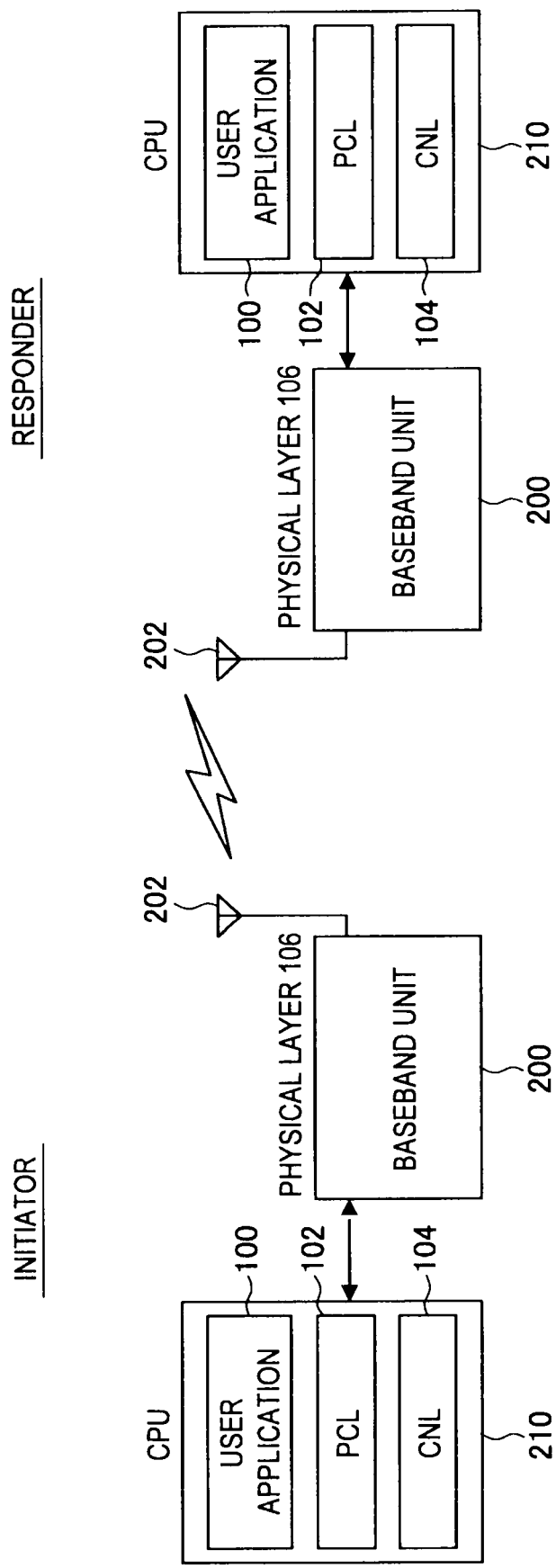
FIG. 7 is a schematic view showing a hardware configuration of the device.

FIG. 7 is a schematic view showing a hardware configuration of the device of the present system. As shown in FIG. 7, the initiator and the responder are respectively configured to include a transmission/reception coupler (communication unit) 202, a chip 200 configuring the physical layer 106, and a CPU 210. The physical layer 106 includes a baseband unit. The user application 100, the PCL 102, and the CNL 104 described above are realized by functioning the CPU 210 with software (program). The software is stored in a memory arranged in the communication device configuring the initiator and the responder, an external recording medium exterior to the communication device, or the like.

The transmission/reception coupler 202 is configured by an electric field coupler, and performs communication through electric field coupling. The transmission/reception couplers 202 of the initiator and the responder are arranged facing each other at a close-range of about 3 cm, and can be electrostatically coupled.

The chip 200 includes a transmission processing unit and a reception processing unit. The transmission/reception coupler 202 is selectively connected to either the transmission processing unit or the reception processing unit by way of a selector. The transmission processing unit generates a transmission signal to transmit from the transmission/reception coupler 202 to the communication counterpart. The transmission processing unit includes components such as a coder for coding the transmission data, a diffuser for diffusing the transmission data, a mapper for extending the transmission data from a binary sequence to a complex signal, and an RF circuit for performing up conversion to a central frequency. The reception processing unit decodes the reception signal received by the transmission/reception coupler 202. The reception processing unit includes components such as a RF circuit input with the reception signal, an AD converter for converting the reception signal to a digital signal, a demapper for demapping the reception signal, and a decoder. The transmission processing unit of the initiator generates a high frequency transmission signal such as UWB signal based on the transmission data when a transmission request is made from the higher level application, and the signal is propagated from the transmission/reception coupler 202 to the communication counterpart. The transmission/reception coupler of the responder performs demodulation and decoding process on the received high frequency signal, and provides the reproduced data to the higher level application. Similar process is performed when sending the data from the responder to the initiator. Therefore, bi-directional communication is realized between the initiator and the responder.

For instance, according to the communication method using high frequency and wide band as in UWB communication, ultra-high speed data transmission of about 100 Mbps can be realized at close-range. When performing the UWB communication by electrostatic coupling instead of the electric wave communication, a very weak electric wave that does not require the permission of the wireless station can be obtained by suppressing the electric field intensity (intensity of electric wave) at a distance of three meters from the wireless facility to smaller than or equal to a predetermined level since the electric field intensity is inversely proportional to the fourth power of the distance. Thus, the communication system can be inexpensively configured. Furthermore, when performing data communication at a very close-range by the electrostatic coupling method, the quality of signal does not lower by the reflective object existing at the periphery, hacking on the transmission path can be reliably prevented, and confidentiality can be ensured. A configuration in which two devices may not simultaneously communicate to one device can be realized by suppressing the electric field intensity to smaller than or equal to a predetermined level such as allowing communication only at a distance of within 3 cm. Therefore, one-to-one communication at close-range can be realized.

Figure 8:
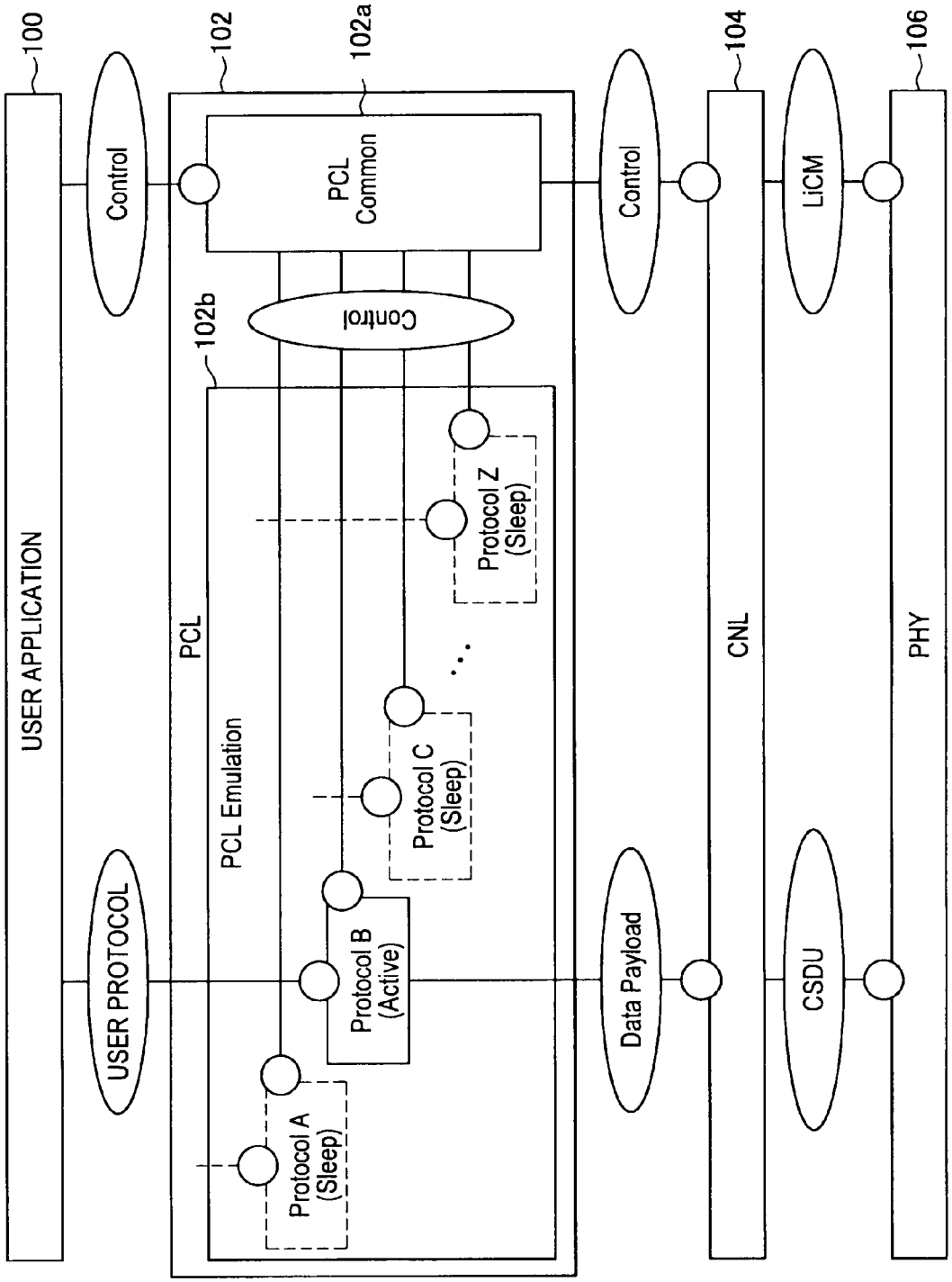
FIG. 8 is a schematic view showing an access point of a service provided by each layer and a relationship between layers.

FIG. 8 is a schematic view showing an access point of a service provided by each layer and a relationship between layers. Higher level of the PCL 102 is the user application 100. The PCL 102 is a layer that provides a service using the lower level CNL 104. In the PCL 102, the roles are divided such that the control is performed by the PCL Common 102a (common processing unit) and the data transfer is performed by the PCL Emulation 102b (conversion processing unit) with respect to the user application 100 of higher level. The service of the PCL 102 is thus defined with respect to the Common and the Emulation.

The service by the PCL Common 102a provides the following services by calling out services of connection/disconnection/other controls of the CNL 104 in response to the request of the user application 100.

control service such as connection and disconnection
event notification service such as error
emulation control service The service by the PCL Emulation 102b exists individually for every corresponding protocol. Each PCL Emulation is a protocol service allowing communication with command and data of universal protocol (USB, OBEX, etc.) on the payload of the CSDU.

In the PCL 102, only the service corresponding to the protocol method selected by the PCL Emulation service can be started. In the PCL Emulation service, the CSDU payload to use the service by the CNL 104 is generated according to the request of the higher level protocol. A plurality of emulation services can be realized in one large-capacity proximity communication device by having the service by the PCL Emulation 102b in plurals. Management is carried out such that the emulation service used in one session is only one type by the PCL Common 102a.

As shown in FIG. 8, the PCL 102 has the functions divided to the PCL Common 102a and the PCL Emulation 102b. The PCL Common 102a provides the basic functions of initialization of service of the lower level layer, connection, disconnection and the like in response to the request of the user application 100 of higher level. Since the processes of the basic functions are performed in the PCL Common 102a, similar processes are performed regardless of which protocol is selected. The PCL Emulation 102b converts an arbitrary protocol of the user application 100 to a protocol format to be handled by the CNL 104 of lower level after startup is completed by the PCL Common 102a.

As described above, the PCL Common 102a provides common function services such as initialization and basic communication (connection, disconnection, device authentication) to the user application 100. The PCL Common 102a is a software commonly provided in all large-capacity proximity communication devices. Therefore, the PCL 102 does not operate with the configuration of only the PCL Emulation 102b.

The PCL Emulation 102b performs user data transfer after connection is performed by the PCL Common 102a, and has a role of mutually converting the user protocol (universal protocol data such as USB and OBEX) to the data format handled by the CNL 104. The PCL Emulation 102b has a role of converting the user protocol data sent from the user application 100 to a format interpretable by the CNL 104 of lower level. The emulation block (conversion module of PCL Emulation 102b) of the PCL 102 provides a service providing the data transfer function in a method similar to the method of controlling the device of existing USB MSC, NFC, and the like when seen from the user application 100. However, the PCL Emulation 102b exists by a number of protocols unique to the user forming the device.

The CNL 104 provides the function using the service of the CNL 104 to two types of PCL (PCL Common 102a, PCL Emulation 102b) of higher level. As hereinafter described in detail, the PCL Emulation 102b includes the conversion module (Protocol A, Protocol B, Protocol C, . . . Protocol Z) for every user protocol, but only one type can be used in one session (connection). The control thereof is performed by the PCL Common 102a. For instance, if the higher level protocol is USB, different conversion modules are prepared according to whether the mass storage class or other methods.

If the user application 100 is the OBEX, the CNL 104 divides the PCL OBEX PDU provided from the PCL Emulation 102b to the CSDU, and generates the CSDU packet. When receiving the user data, the CNL 104 connects the CSDU up to the final CSDU, and provides the same to the PCL Emulation 102b. The PCL Emulation 102b provides the PCL OBEX PDU to the OBEX protocol layer (user application 100).

If the user application 100 is the SCSI, the CNL 104 divides the PCL SCSI PDU provided from the PCL Emulation 102b to the CSDU, and generates the CSDU packet. When receiving the user data, the CNL 104 connects the CSDU up to the final CSDU, and provides the same to the PCL Emulation 102b. The PCL Emulation 102b provides the PCL SCSI PDU to the SCSI initiator or the SCSI target (user application 100).

In the large-capacity proximity communication device, the user forming the device can freely set the conversion module corresponding to the protocol of higher level and build the PCL Emulation 102b. The conversion module can be freely added or deleted by the user. Since the PCL Common 102a is the basic function of protocol conversion, it is obliged to be common in all large-capacity proximity communication devices.

In FIG. 8, Protocols A to Z are indicated for the user protocol, where Protocol B is active and a state in which the connection is made from the Protocol B is shown. In this case, the connection by the Protocol B is performed in both the initiator and the responder. Which protocol to establish the connection is determined by the negotiation carried out between the initiator and the responder.

[Specific Example of Connection Establishment Process and Negotiation Process]

Figure 9:
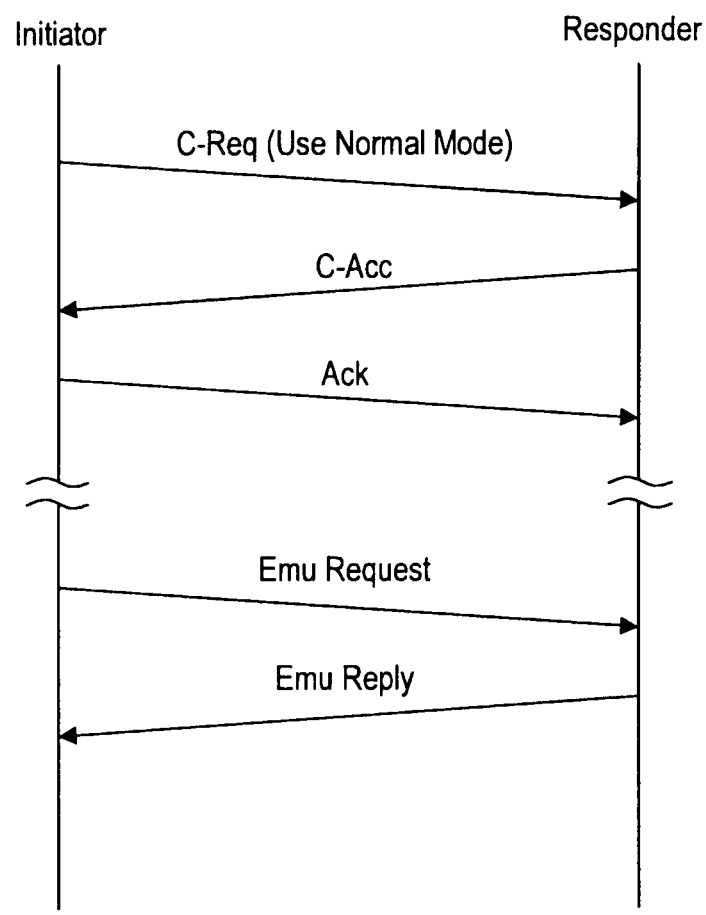
FIG. 9 is a schematic view showing a connection establishment process and a negotiation process in the system of the present embodiment.

FIG. 9 is a schematic view showing the connection establishment process and the negotiation process in the system of the present embodiment. As shown in FIG. 9, the connection is established when one device (initiator) transmits a connection request frame C-Req to the other device (responder), and the initiator receives a connection response frame C-Acc transmitted from the responder. One of the large-capacity proximity communication devices is on the side using the service and the other is on the side providing the service. In the specification and the drawings, the side providing the service is sometimes referred to as Proactive device, and the side being provided with the service is sometimes referred to as Reactive device. These are classifications in the user application 100, and essentially, the initiator is the proactive device and the responder is the reactive device. As shown in FIG. 9, the connection request frame is transmitted to the communication counterpart by the device on the proactive side input with the user action such as data file transfer and data file selection.

The connection request frame can be periodically transmitted at a predetermined timing regardless of the presence of the user action. In this case, the transmission of the connection request frame C-Req by the communication device is periodically made at a predetermined cycle regardless of whether or not the communication counterpart is positioned nearby. Thus, even if the user action such as file transfer is not made from the initiator, the responder can receive the periodically transmitted connection request frame C-Req. The connection is established by returning the connection response frame C-Acc from the responder. Therefore, in a case where the user action is not particularly made, the connection can be established by bringing the initiator and the responder close to a range where proximate wireless communication can be carried out. When connection is established, the negotiation, to be hereinafter described, is performed, and when the negotiation is completed, both the initiator and the responder can reference the memory such as the hard disc of the counterpart. The data file can be transferred by specifying the data file from the directory. The data file is transferred by the CSDU packet.

In the present embodiment, the negotiation process is performed after the connection is established, and the optimum PCL Emulation 102*b* is selected in both the initiator and the responder. As shown in FIG. 9, the negotiation is performed by sending a request packet (Emu Request) of emulation from the initiator to the responder, and returning the return packet (Emu Reply) of emulation from the responder.

Figure 10:
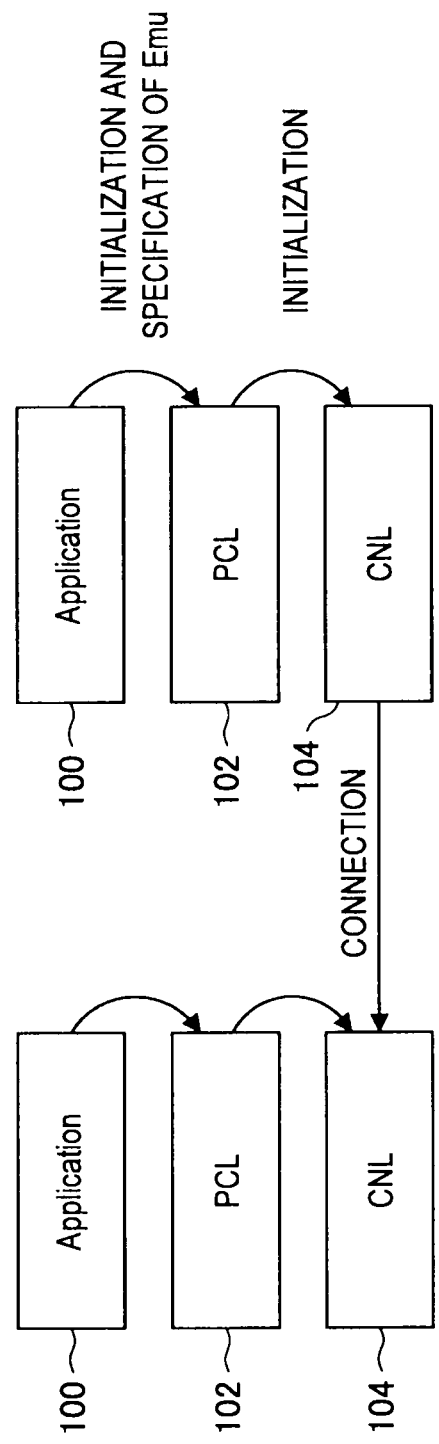
FIG. 10 is a schematic view showing a state in which the connection of the initiator and the responder is established.

FIG. 10 shows a state in which the connection of the initiator and the responder is established. Before the connection is established, the PCL 106 performs a process of initializing the CNL 104. The initialization of the PCL 106 is performed by the application when the application is started. As shown in FIG. 10, the initiator and the responder are connected at the level of the CNL when the connection is established. Thus, the illustration of the physical layer 106 is omitted in FIGS. 10, 11, 12, and 14.

Figure 11:
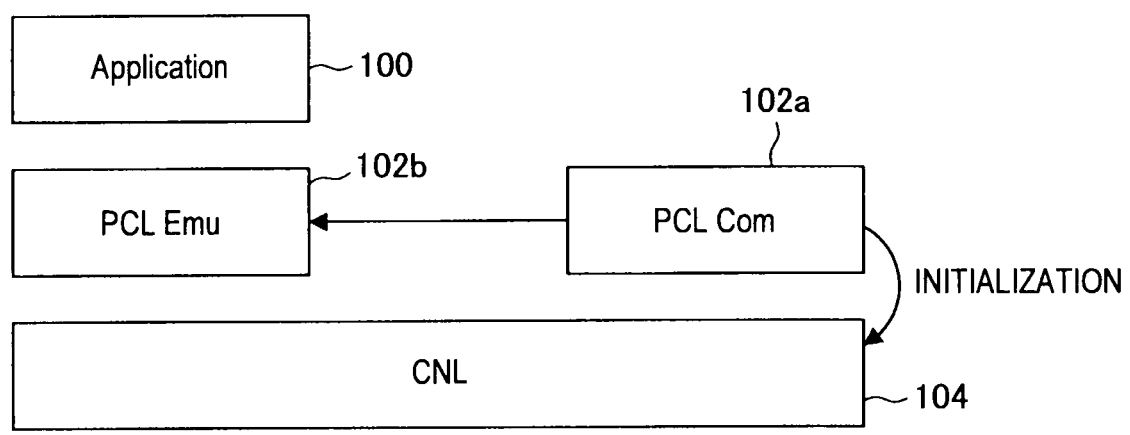
FIG. 11 is a schematic view showing a state of selecting the PCL Emulation in the responder.

The negotiation is performed after the connection is established. FIG. 11 is a schematic view showing a state of selecting the PCL Emulation 102*b* in the responder, and shows a state in which the PCL Common 102*a* is selecting one appropriate PCL Emulation 102*b* as a result of the negotiation. Similarly, one PCL Emulation 102*b* is determined as a result of the negotiation on the initiator side.

The application starts after the PCL Emulation 102*b* is selected. Therefore, in the present embodiment, the higher level application 100 may not start before the connection is established in the initiator or the responder. It can be recognized that the negotiation is performed while the higher level application 100 is working, and similar series of protocol conversion process can be realized.

The details of the connection establishment process and the negotiation process will be described below. A case (case 1) where only the application of the initiator has started and the application of the responder has not started in time of connection, and a case (case 2) where the applications of both the initiator and the responder are not started will be described below.

Figure 12:
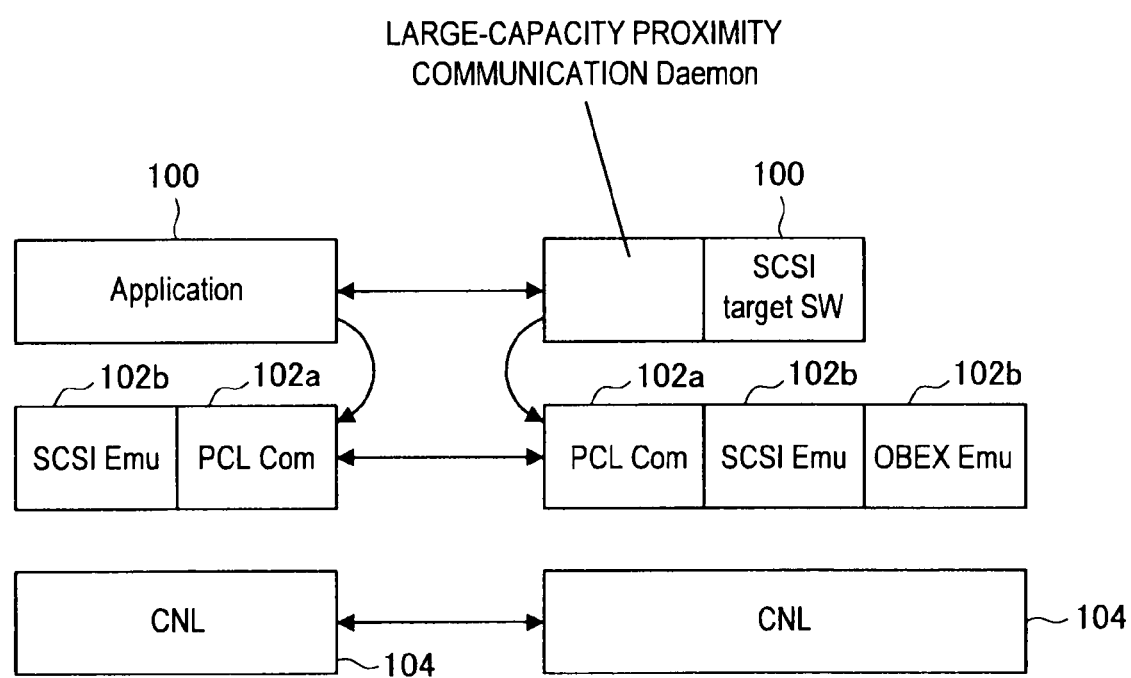
FIG. 12 is a schematic view showing the negotiation in case 1.

FIG. 12 is a schematic view showing the negotiation in case 1. In the example shown in FIG. 12, the communication device on the initiator side includes an SCSI (Small Computer System Interface) for the PCL Emulation 102*b*. The communication device on the responder side includes two PCL Emulations 102*b*, the SCSI and the OBEX (Object Exchange).

Since the initiator includes only the SCSI for the PCL Emulation 102*b*, the initiator adds a request notifying to use the SCSI for the PCL Emulation 102*b* to Emu Request, and transmits the same. Although the application is not started, a function block called a large-capacity proximity communication Daemon is usually started for negotiation in the responder. In the responder, the large-capacity proximity communication Daemon cooperatively operates with the PCL Common 102*a* to perform the function of the negotiation, and recognizes SCSI and OBEX for the selectable PCL Emulations 102*b*. The large-capacity proximity communication Daemon (and PCL Common 102*a*) selects the SCSI requested from the initiator of the PCL Emulations 102*b* it includes based on the received Emu Request. The responder then transmits Emu Reply including the information notifying that the SCSI is selected. The negotiation is thereby completed, and the SCSI is selected for the PCL Emulation 102*b* in both the initiator and the responder.

When the negotiation is completed and the responder selects the SCSI, the responder starts the SCSI target SW for the application. The SCSI target SW is a software for processing read and write of data, and is normally used as a firmware of hard disc and the like. With the SCSI target SW started on the responder side, the applications are started in both the initiator and the responder, and data can be transmitted and received using both applications.

Figure 13:
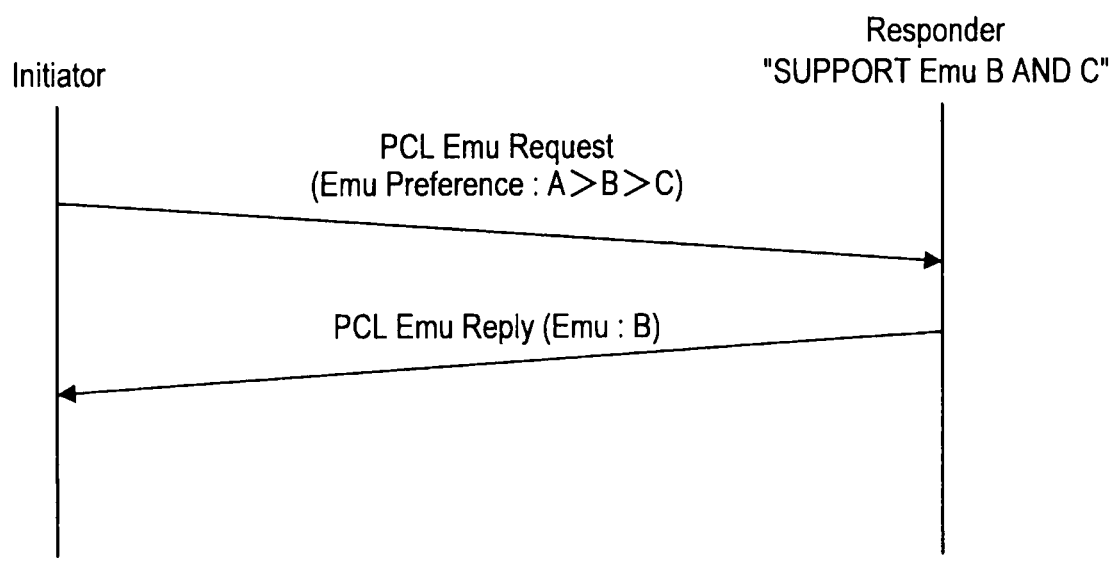
FIG. 13 is a schematic view showing the flow of Emu Request and Emu Reply of when priority is given.

In the example of FIG. 12, if the initiator side also includes both PCL Emulations 102*b* of the SCSI and the OBEX, the initiator gives priority to the SCSI and the OBEX. The initiator can send a request notifying to desirably use the SCSI or the OBEX for the PCL Emulation 102*b* after giving priority. The priority can be determined according to the adaptability of the application of the initiator and the PCL Emulation 102*b*. FIG. 13 is a schematic view showing the flow of Emu Request and Emu Reply of when priority is given. In this case, Emu Request given priority is transmitted from the initiator to the responder. In the example of FIG. 13, the priorities are given in the order of A>B>C for three PCL Emulations A, B, C of the initiator. The responder supports the PCL Emulations B, C. In this case, the responder selects the highest priority B of the PCL Emulations B, C it includes, and transmits Emu Reply including the information notifying the same to the initiator. For instance, if the OBEX is requested as higher priority than the SCSI from the initiator, the responder selects OBEX from the SCSI and OBEX that can be selected. The negotiation is thereby completed, and the OBEX is selected for the PCL Emulation 102b in both the initiator and the responder.

Therefore, if a device in which the application is not started is connected, the large-capacity proximity communication Daemon that is usually started executes the negotiation function. Therefore, the negotiation can be performed without starting the application. The application corresponding to the selected PCL Emulation 102b can be started after the negotiation is completed.

Figure 14:
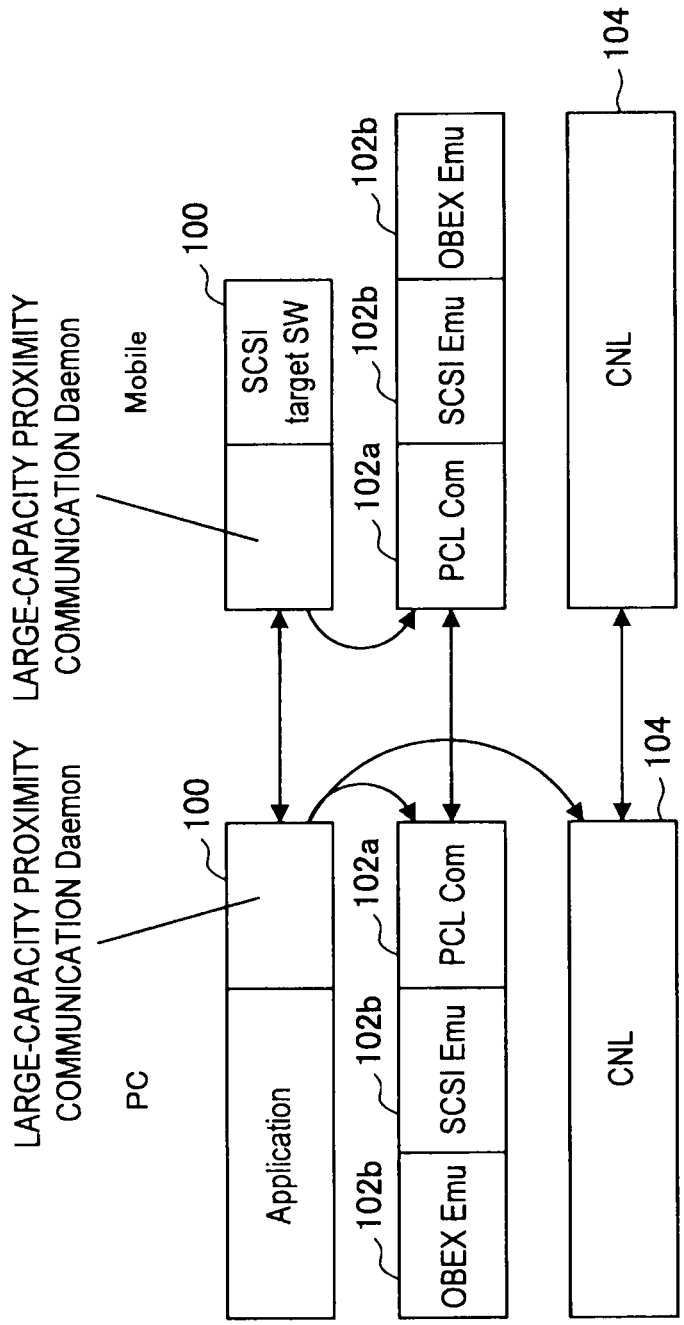
FIG. 14 is a schematic view showing the negotiation of case 2.

FIG. 14 is a schematic view showing the negotiation of case 2. In case 2 in which the applications of both the initiator and the responder are not started, the large-capacity proximity communication Daemon is usually started in both the initiator and the responder. Both the initiator and the responder include the SCSI and the OBEX for the PCL Emulation 102b.

When the connection is established, the initiator gives priority to the SCSI and the OBEX through the negotiation function of the large-capacity proximity communication Daemon, and then sends a request to desirably use the SCSI or the OBEX for the PCL Emulation 102b. Assume the initiator gives higher priority to the SCSI and transmits Emu Request. In the responder, the large-capacity proximity communication Daemon recognizes SCSI and OBEX for the PCL Emulation 102b that can be selected on the responder side. The large-capacity proximity communication Daemon (and PCL Common 102a) of the responder selects the SCSI based on the priority requested from the initiator based on the received Emu Request. The responder transmits Emu Reply including information notifying that the SCSI is selected to the initiator. The negotiation is thereby completed, and the same PCL Emulation 102b (SCSI) is selected in both the initiator and the responder. After the negotiation is completed, the application is started in the initiator, and the SCSI target SW is started in the responder.

In negotiation, the optimum PCL Emulation 102b can be selected based on the identification information of the communication device. In this case, the inquiry of the identification information is first sent from the initiator to the responder. The responder sends the identification information related to the own device to the initiator. The identification information includes type of device of the responder, information indicating specification (e.g., product number etc.), and information indicating the operation mode of the device. When receiving the identification information, the initiator determines the application to start according to the identification information. For instance, if the responder is a walkman, the responder sends the identification information that it is a walkman to the initiator. The initiator receiving the identification information determines to start a sonic stage suited to the walkman for the application. The initiator then sets the priority of the SCSI adapted to the sonic stage to the highest, and sends Emu Request added with the information notifying that it can respond to both the SCSI and the OBEX. If the responder supports both the SCSI and the OBEX, the responder selects the SCSI of high priority based on the received Emu Request. As a result, the responder transmits Emu Reply including the information notifying that the SCSI is selected to the initiator. The negotiation is thereby completed, and the SCSI is selected in both the initiator and the responder.

Figure 15:
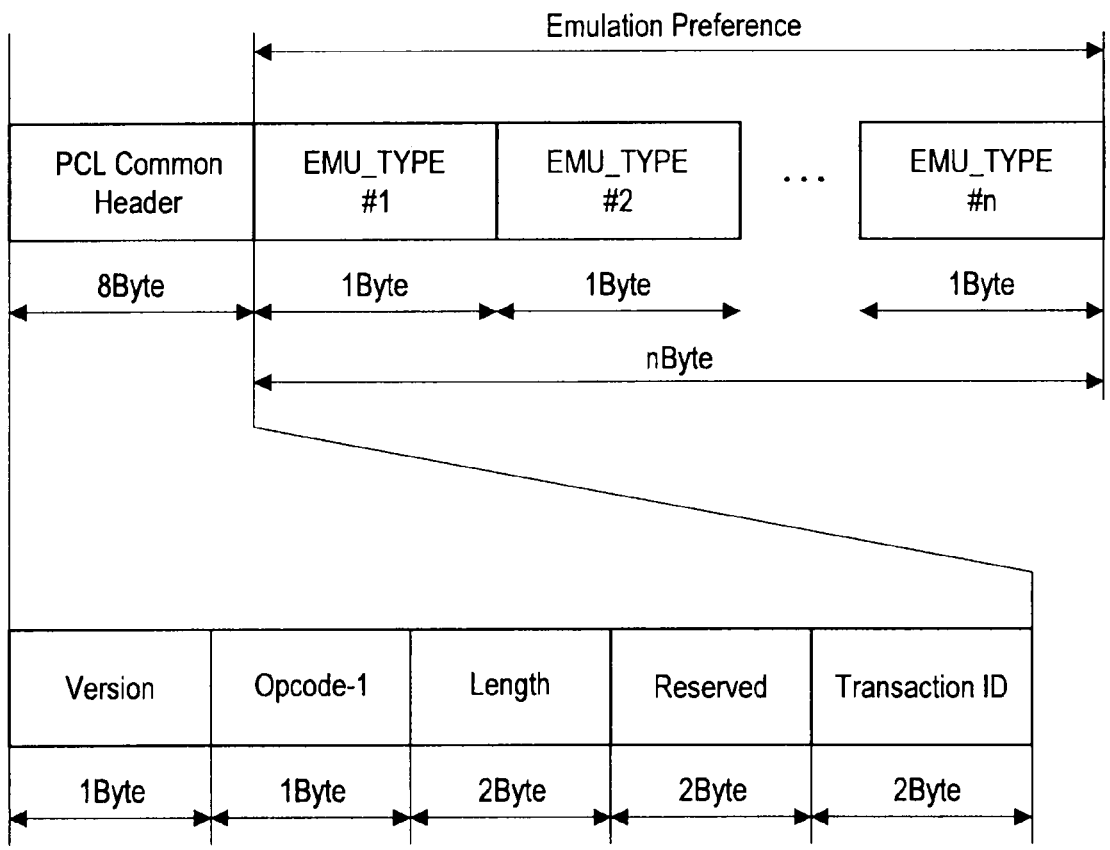
FIG. 15 is a schematic view showing an example of a data packet of Emu Request.

FIG. 15 is a schematic view showing an example of a data packet of Emu Request. As shown in FIG. 15, Emu Request contains plurality of information of EMU_TYPE#1 to #n behind the PCL Common Header (eight Byte). Emu_TYPE#1 to #n corresponds to each PCL Emulation 102b such as SCSI and OBEX to which the initiator can respond. Emu_TYPE#1 positioned at the leading end is the PCL Emulation 102b of highest priority.

Figure 16:
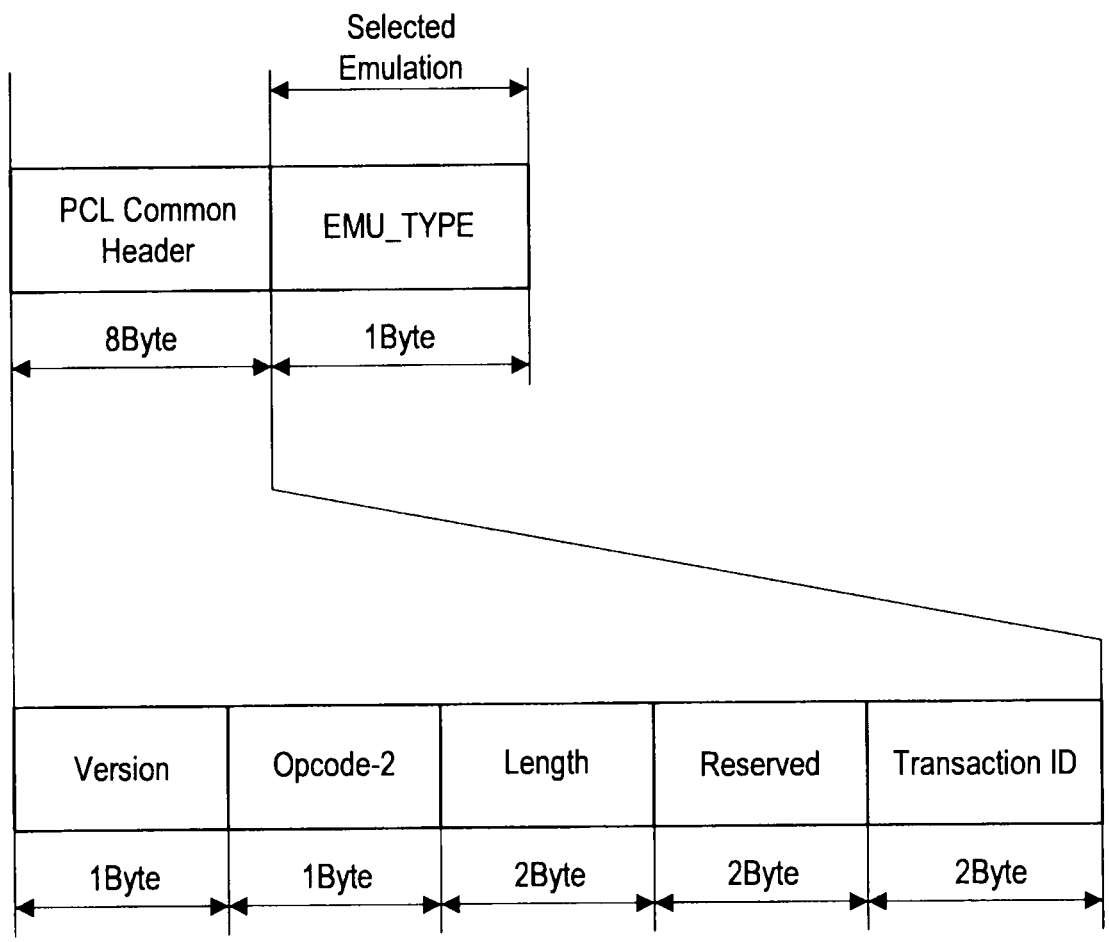
FIG. 16 is a schematic view showing an example of a data packet of Emu Reply.

FIG. 16 is a schematic view showing an example of a data packet of Emu Reply. As shown in FIG. 16, Emu Reply contains information of one EMU_TYPE selected on the responder side by the negotiation behind the PCL Common Header (eight Byte). For instance, if the OBEX is selected on the responder side, Emu_TYPE contained in Emu Reply is the information corresponding to the OBEX.

Figure 17:
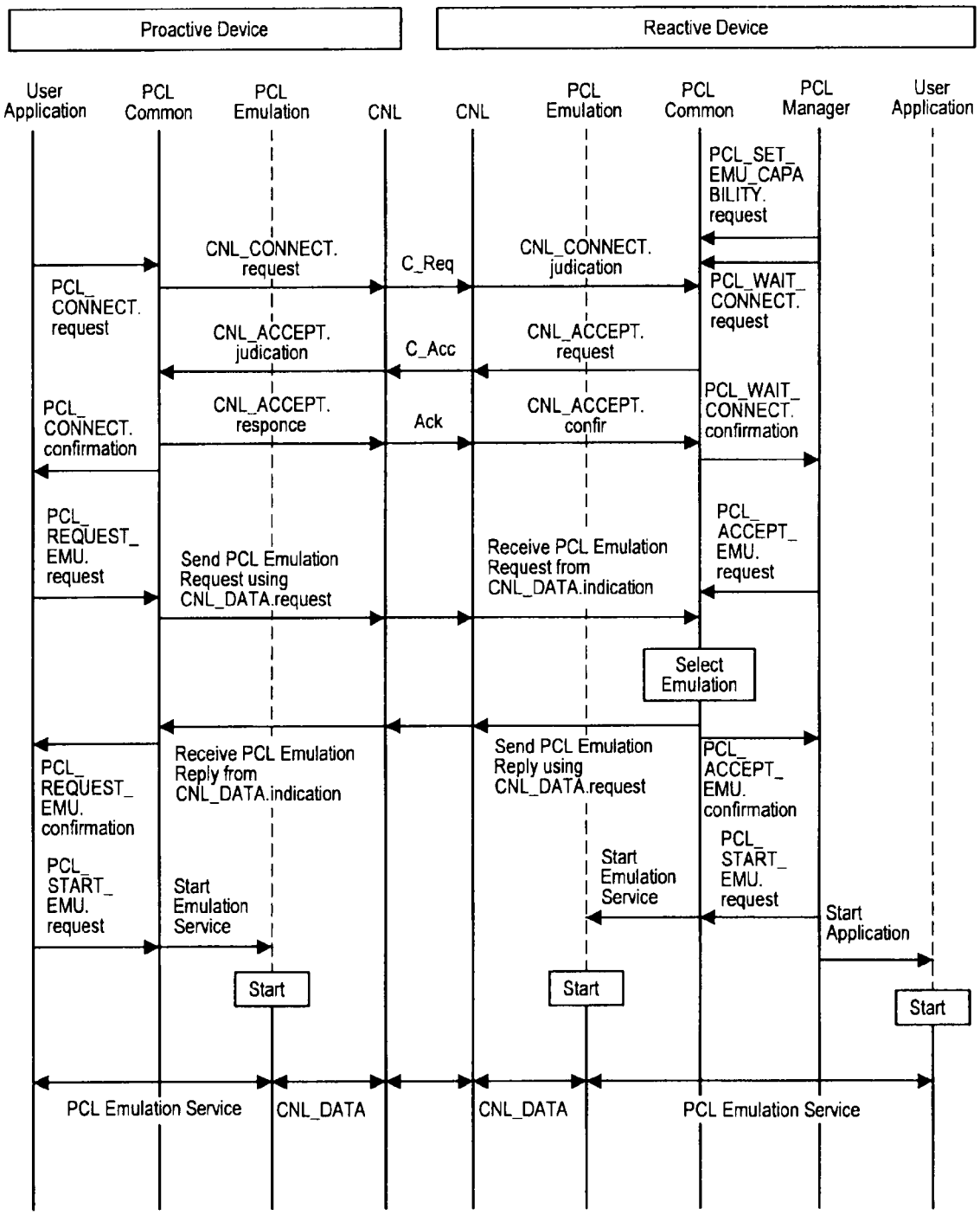
FIG. 17 is a schematic view showing the data flow in both the initiator and the responder in case 1.

FIG. 17 is a schematic view showing the data flow in both the initiator and the responder in case 1. As shown in FIG. 17, the CNL transmits C_Req to the responder when receiving CNL_CONNECT.request from the PCL Common or the higher level layer. The responder transmits C_Acc to the initiator when receiving C_Req, and the initiator receiving C_Acc sends Ack as a response to the responder. The connection is thereby established.

After the connection is established, the initiator transmits Emu Request to the responder, and the responder transmits Emu Reply to the initiator. The negotiation is thereby completed. After the negotiation is completed, data is transmitted and received between the initiator and the responder.

In FIG. 17, the PCL Manager is a component corresponding to the large-capacity proximity communication Daemon. The PCL Manager is started from before the connection is established, acquires the information (PCL_SET_EMU_CAPABILITY.request) related to the selectable PCL Emulation, and transmits to the PCL Common. The PCL Common selects the PCL Emulation (Select Emulation) based on such information. The PCL Manager starts the application (Start Application) after the negotiation is completed.

Figure 18:
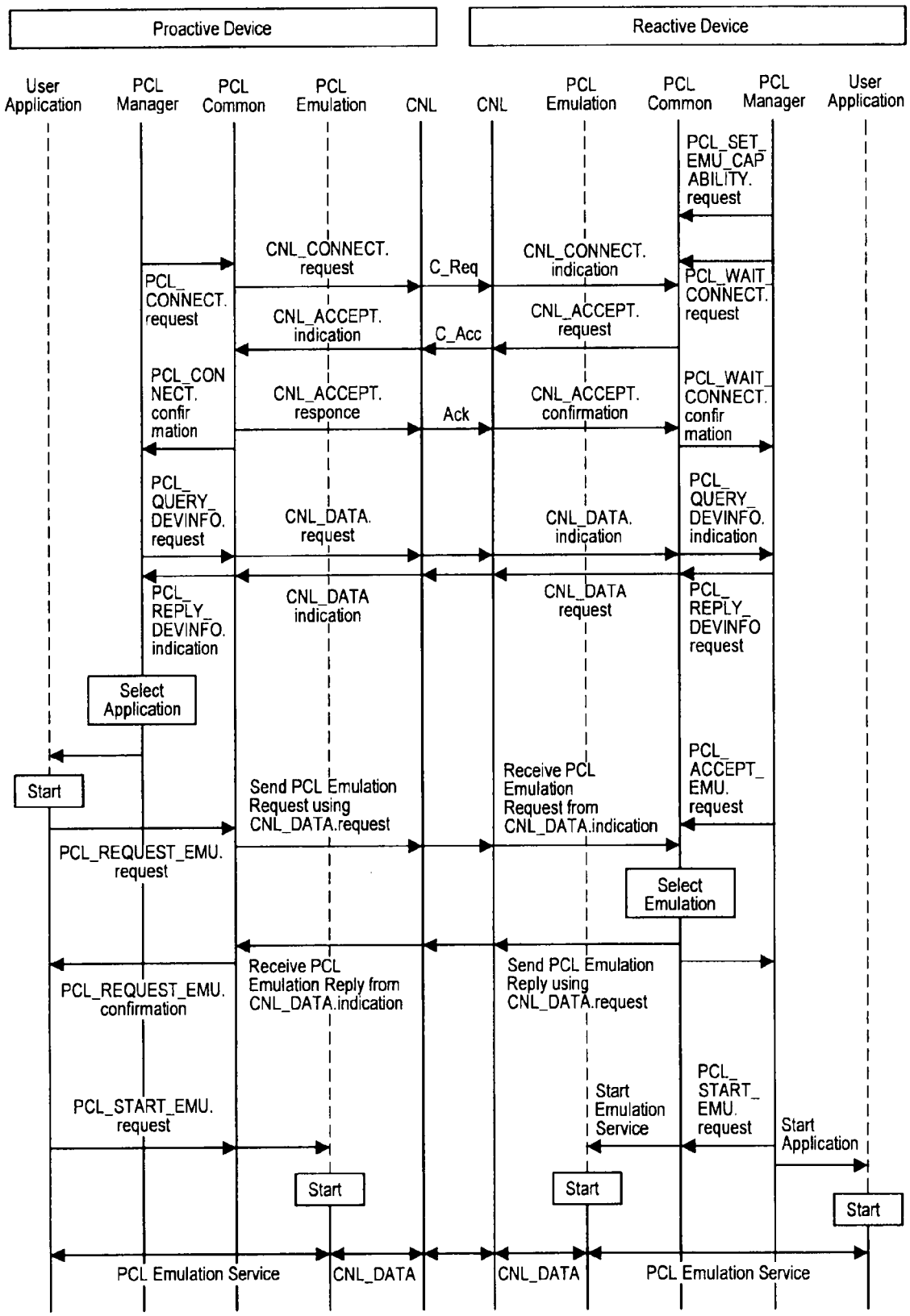
FIG. 18 is a schematic view showing the data flow of both the initiator and the responder of when determining the PCL Emulation based on the identification information in case 2.

FIG. 18 is a schematic view showing the data flow of both the initiator and the responder of when determining the PCL Emulation based on the identification information in case 2. As shown in FIG. 18, the CNL transmits C_Req to the responder when receiving CNL_CONNECT.request from the PCL Common or the higher level layer. The responder transmits C_Acc to the initiator when receiving C_Req, and the initiator receiving C_Acc sends Ack as a response to the responder. The connection is thereby established.

After the connection is established, the PCL of the initiator transmits CNL_DATA.request to the CNL, and the CNL requests for the identification information. In the responder, the PCL Common acquires the identification information (PCL_QUERY_DEVINFO) from the PCL Manager, and transmits CNL_DATA.request to the CNL. The identification information is thereby transmitted to the initiator.

Thereafter, in the initiator, the application is selected (Select Application) based on the identification information, and the application is started. The initiator then transmits Emu Request to the responder, and the responder transmits Emu Reply to the initiator. The negotiation is thereby completed. After the negotiation is completed, the data is transmitted and received between the initiator and the responder.

Figure 19:
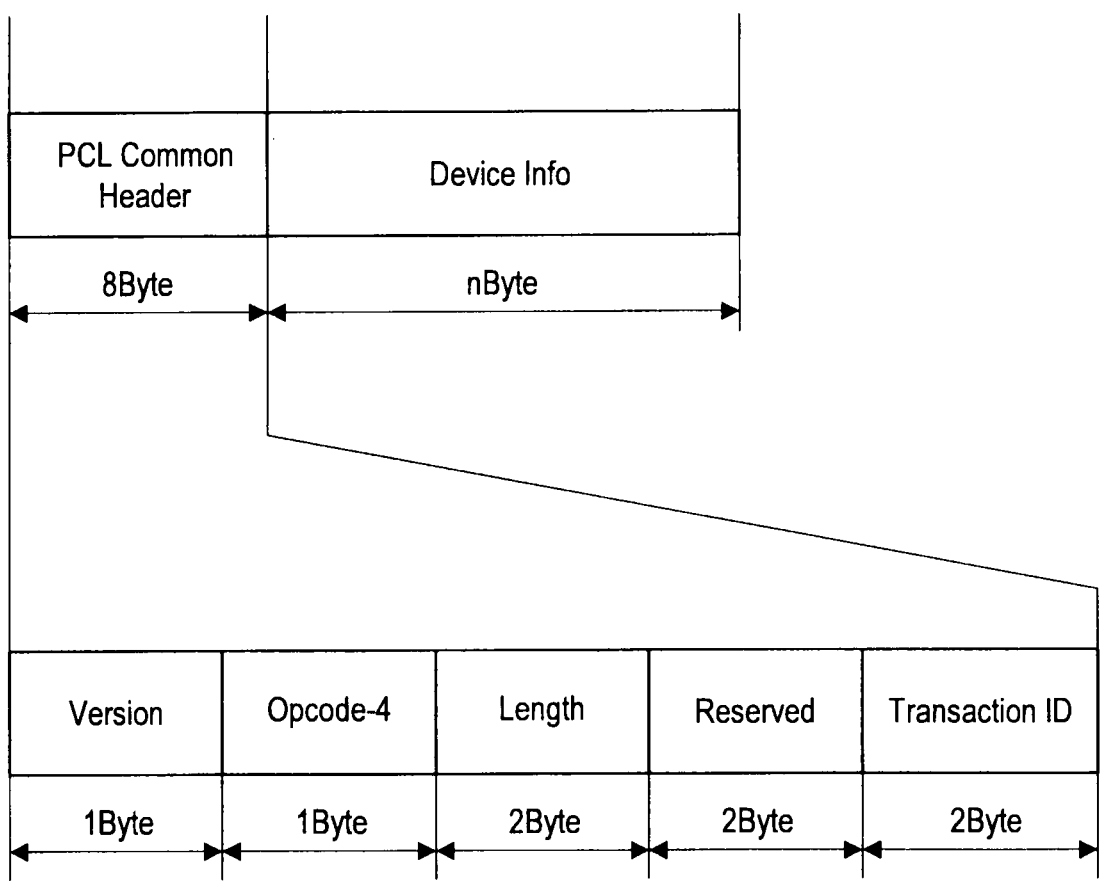
FIG. 19 is a schematic view showing a data packet containing identification information transmitted from the responder.

FIG. 19 is a schematic view showing a data packet containing identification information transmitted from the responder. As shown in FIG. 19, the data packet contains device information (Device Info) corresponding to the identification information behind the PCL Common Header (eight Byte). When receiving the data packet shown in FIG. 19, the initiator acquires information such as the specification and the operation mode of the product of the responder from the device information.

Figure 20:
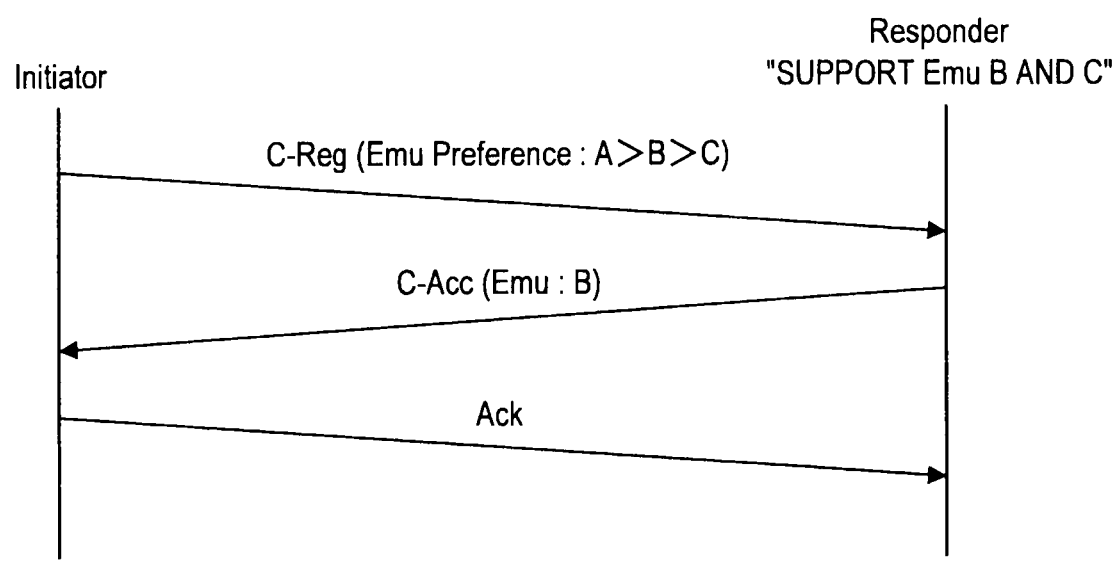
FIG. 20 is a schematic view showing the data flow when performing negotiation simultaneously with the connection establishment.

In the example described above, the negotiation is performed after the connection is established, but the negotiation is simultaneously performed when desiring to start data communication at higher speed. FIG. 20 is a schematic view showing the data flow when performing negotiation simultaneously with the connection establishment. In this case, the information of Emu Request related to the negotiation is added to C-Req, and the information of Emu Reply is added to C-Acc. In the example of FIG. 20, the PCL Emulation supported by the initiator and the information (Emu Preference: A>B>C) related to the priority thereof are added to C_Req and transmitted to the responder. The responder receiving C-Req selects B of high priority when supporting the PCL Emulations B, C. The information notifying that the Emulation B is selected is added to C-Acc and transmitted. The time from the connection establishment to the completion of the negotiation can be reduced and data can be transmitted and received from an earlier stage by performing the negotiation simultaneously with the connection establishment.

Figure 21:
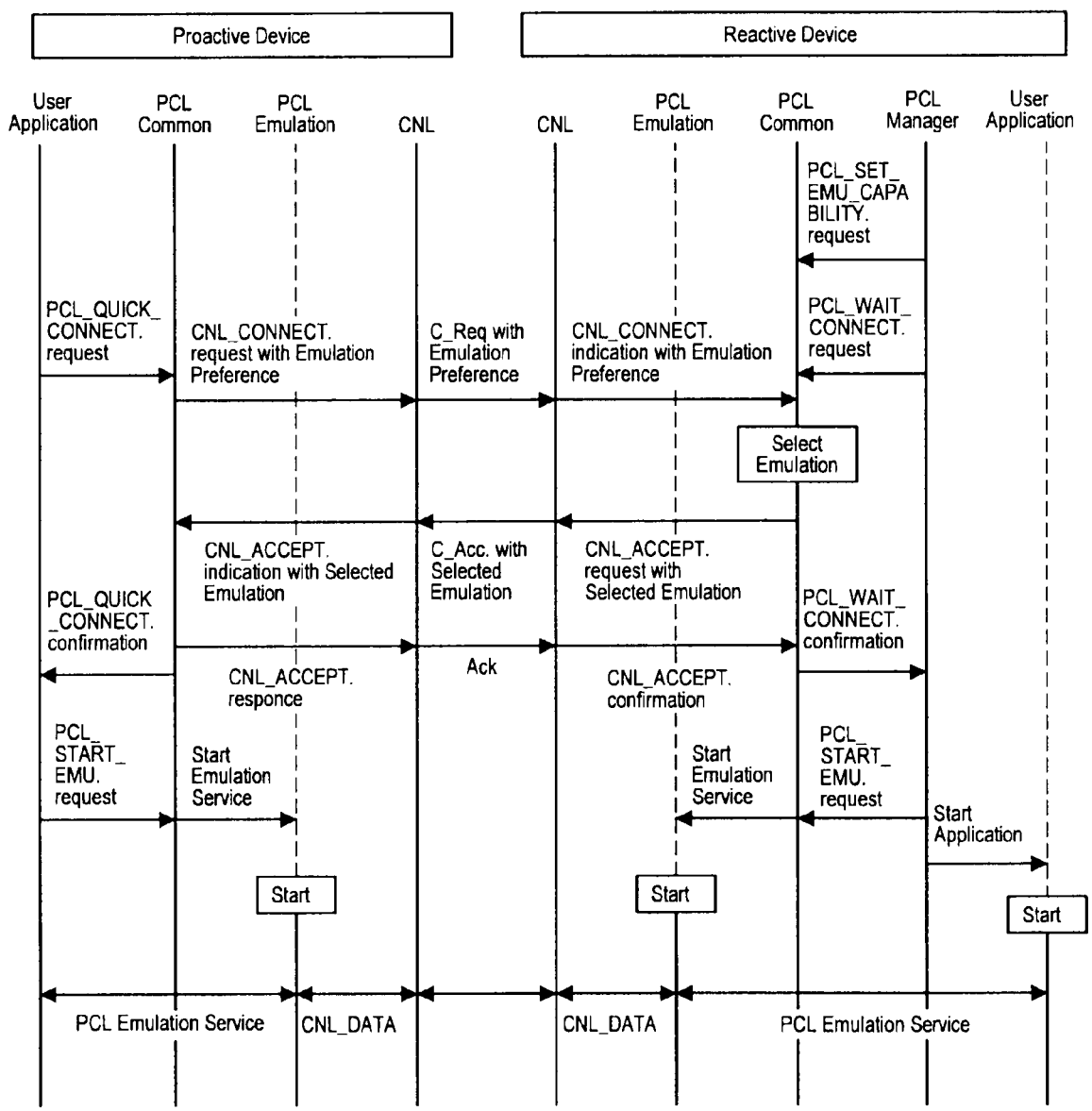
FIG. 21 is a schematic view showing in detail the data flow in both the initiator and the responder in the case of FIG. 20.

FIG. 21 is a schematic view showing in detail the data flow in both the initiator and the responder in the case of FIG. 20. The CNL transmits C_Req added with the priority of the PCL Emulation to the responder when receiving CNL_CONNECT.request with Emulation Preference from the PCL Common or the higher level layer. The responder selects the PCL Emulation when receiving C_Req. The responder adds the information of the selected PCL Emulation to C_Acc, and sends the same to the initiator. The initiator receiving C_Acc sends Ack as a response to the responder. The negotiation is thereby completed with the connection, and the selected PCL Emulation is started in both the initiator and the responder. The application is also started in the responder.

Therefore, according to the present embodiments, the application is started after establishing the connection or after performing the negotiation simultaneously with the connection establishment and selecting the PCL Emulation 102b common in both the initiator and the responder. Thus, even if the user using the communication device has not started the application beforehand, the application can be started with the optimum PCL Emulation 102b selected in time of connection establishment. The wireless communication system has been described above by way of example, but the communication system may be wired communication system.

The present invention contains subject matter related to Japanese Patent Application JP 2008-212287 filed in the Japan Patent Office on Aug. 20, 2008, the entire contents of which being incorporated herein by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A communication device comprising:
   a physical layer for performing close-range one-to-one communication with a device of a communication counterpart by electric field coupling or magnetic field coupling;
   a plurality of different conversion processing units each configured to convert a protocol of a single higher level application which is arbitrarily set for each device to a different protocol for communicating at the physical layer; and
   a selection processing unit for performing negotiation with the device of the communication counterpart after the connection with the communication counterpart is established or at the same time as the connection establishment to select one conversion processing unit and decide one protocol conversion of the protocol conversion by the conversion processing units to convert the protocol of the single higher level application,
   wherein the plurality of conversion processing units and the selection processing unit operate at a same layer between the higher level application and the physical layer.

2. The communication device according to claim 1, wherein the selection processing unit includes a negotiation function portion for performing the negotiation without the higher level application started.

3. The communication device according to claim 1, wherein the selection processing unit performs a process of transmitting information related to the plurality of conversion processing units to the device of the communication counterpart when negotiating with the device of the communication counterpart.

4. The communication device according to claim 1, wherein the selection processing unit gives priority to the plurality of conversion processing units and performs a process of transmitting to the device of the communication counterpart when negotiating with the device of the communication counterpart.

5. The communication device according to claim 1, further comprising a higher level application starting unit for starting the higher level application when one conversion processing unit is selected by the selection processing unit.

6. The communication device according to claim 1, wherein the selection processing unit acquires identification information related to the device of the communication counterpart, and selects one conversion processing unit based on the identification information.

7. A communication system comprising:
   a first communication device configured to perform communication with a second communication device through a close-range one-to-one communication by electric field coupling or magnetic field coupling; and
   the second communication device including a physical layer for performing communication with the first communication device, a plurality of different conversion processing units each configured to convert a protocol of a single higher level application which is arbitrarily set for each device to a different protocol for communicating at the physical layer, and a selection processing unit for performing negotiation with the device of the communication counterpart after the connection with the communication counterpart is established or at the same time as the connection establishment to select one conversion processing unit and decide one protocol conversion of the protocol conversion by the conversion processing units to convert the protocol of the single higher level application, wherein the plurality of conversion processing units and the selection processing unit operate at a same layer between the higher level application and the physical layer in the second communication device.

8. A communication method, implemented on a communication device having a physical layer for performing close-range one-to-one communication with a device of a communication counterpart by electric field coupling or magnetic field coupling, comprising the steps of:
- converting, at one of a plurality of different conversion processing units, a protocol of a single higher level application which is arbitrarily set for each device to a protocol for communicating at the physical layer, each of the different conversion processing units being configured to convert the protocol of a single higher level application to a different protocol for communicating at the physical layer; and
- performing, at a selection processing unit, negotiation with the device of the communication counterpart after the connection with the communication counterpart is established or at the same time as the connection establishment to select one conversion processing unit and decide one protocol conversion of the protocol conversion by the conversion processing units to convert the protocol of the single higher level application,
- wherein the plurality of conversion processing units and the selection processing unit operate at a same layer between the higher level application and the physical layer.

9. A non-transitory computer readable storage medium encoded with computer executable instructions, which when executed by a communication device, having a physical layer for performing close-range one-to-one communication with a device of a communication counterpart by electric field coupling or magnetic field coupling, cause the communication device to perform a method comprising:
- converting, at one of a plurality of different conversion processing units, a protocol of a single higher level application which is arbitrarily set for each device to a protocol for communicating at the physical layer, each of the different conversion processing units being configured to convert the protocol of a single higher level application to a different protocol for communicating at the physical layer; and
- performing, at a selection processing unit, negotiation with the device of the communication counterpart after the connection with the communication counterpart is established or at the same time as the connection establishment to select one conversion processing unit and decide one protocol conversion of the protocol conversion by the conversion processing units to convert the protocol of the single higher level application,
- wherein the plurality of conversion processing units and the selection processing unit operate at a same layer between the higher level application and the physical layer.

* * * * *